US005317794A

United States Patent [19]

Lerner et al.

[11] Patent Number: 5,317,794

[45] Date of Patent: Jun. 7, 1994

[54] METHOD OF DELABELLING

[75] Inventors: Hershey Lerner, Aurora; Dana J. Liebhart, Cuyahoga Falls; Richard W. Hess, Hudson, all of Ohio

[73] Assignee: Automated Label Systems Company, Twinsburg, Ohio

[21] Appl. No.: 941,388

[22] Filed: Sep. 8, 1992

[51] Int. Cl.[5] ........................ B23P 19/00; B32B 31/18

[52] U.S. Cl. ................................ 29/426.3; 29/426.4; 156/344; 156/584

[58] Field of Search ................ 29/426.1, 426.3, 426.4, 29/426.5; 15/60, 61; 83/53, 177; 134/72, 129, 131, 104.4; 156/194, 247, 248, 344, 584; 264/37; 241/39

[56] References Cited

U.S. PATENT DOCUMENTS

| | | | |
|---|---|---|---|
| 2,573,169 | 10/1951 | Gerlach et al. | 15/60 X |
| 3,996,825 | 12/1976 | Terry | 83/53 |
| 4,013,497 | 3/1977 | Wolf | 156/344 X |
| 4,152,958 | 5/1979 | Bogert | 83/53 X |
| 4,717,442 | 1/1988 | Hopson | 156/344 X |
| 4,830,699 | 5/1989 | Burlet et al. | 15/60 X |
| 4,834,826 | 5/1989 | Abe et al. | 156/344 |
| 5,031,496 | 7/1991 | Lobash et al. | 83/177 X |
| 5,152,865 | 10/1992 | Hurst | 156/344 |

*Primary Examiner*—Timothy V. Eley
*Attorney, Agent, or Firm*—Watts, Hoffmann, Fisher & Heinke Co.

[57] ABSTRACT

A machine for removing tubular plastic labels from bottles to facilitate their re-use and recycling. The machine has a multi-station turret and supply and exit conveyors to sequentially supply labeled bottles in line to the turret and remove delabeled bottles from the turret. The delabeling is accomplished with a cutter which is preferably in the form of a high-pressure jet of water. Ideally, the cutter is adjusted so that it is a differential cutter which will cut a label without cutting or marring a bottle from which a label is being removed. With one embodiment, a water flush mechanism is provided to flush cut labels from their bottles and the turret onto a screen conveyor. The flush water passes through the conveyor into a container from which it is pumped for re-use. Removed labels are transported by the screen conveyor to a collection bin. With another embodiment, an air blast mechanism is used to strip cut labels from bottles and a vacuum pick up is used to collect stripped labels.

33 Claims, 7 Drawing Sheets

METHOD OF DELABELLING

TECHNICAL FIELD

This invention relates to bottle delabelers, and more particularly, to a high-speed automatic delabeler especially suited for removing tubular plastic labels from bottles and a method of label removal.

CROSS-REFERENCE

U.S. patent application Ser. No. 07/789,257 filed Nov. 7, 1991 by Hershey Lerner et al. entitled "High-Speed Sleever."

U.S. patent application Ser. No. 07/012,255 filed Feb. 1, 1993 entitled "Desleever System and Method," now U.S. Pat. No. 4,828,296.

BACKGROUND OF THE INVENTION

Plastic labels are enjoying increasing use for labeling beverage and other bottles. Many of these labels are of a wrap-around type, each of which is adhesively secured to its bottle. Plastic labels in the form of tubular sleeves, each of which is slid over the bottle are being used in increasing quantities.

Until recently, the major advantage of wrap-around labels has been their low-cost achieved by high-speed labeling machines that have had greater throughput than sleeving machines. With the advent of the machine of the Labeler Patent, wrap-around labels no longer enjoy economic advantage over tubular sleeves. Indeed, given that the glue accounts for approximately eight percent of their cost, wrap-around labels are now more expensive. This is especially true if one takes into account the fact that, if there is a labeling malfunction with a glue-on label, both bottle and label are typically thrown away while, with the sleeve labels, the label is removed and another label is applied to the bottle.

A major advantage of tubular sleeve labels is that they can be removed from bottles to enable total recycling of both the bottle and the label. Wrap-around labels, on the other hand, make it impractical to fully recycle such things as a labeled plastic bottle because the label cannot be economically separated from the bottle, and the label and bottle are typically made of different materials, namely polyethylene for labels and P.E.T. for the bottles.

The Case Desleever Patent discloses and claims a system for removing labels from bottles as a set of bottles are transferred from a case to, for example, a washer for processing bottles for re-use. While the machine of the Case Delabeler Patent is quite satisfactory for its purpose, there has remained a need for a high-speed effective automatic delabeler for removing labels from used bottles in a bottling plant where they are to be refilled and relabeled as by the machine of the Labeler Patent. The need is especially apparent where the bottles to be delabeled are fluted or otherwise specially configured. This need is increasing because the re-use of bottles of both and glass and plastic is increasing at significant rates.

SUMMARY OF THE INVENTION

With a delabeling machine made in accordance with the present invention, a bottle transporter is provided. The transporter has a series of spaced delabeling stations which successively receive bottles from a supply conveyor and transport them to a discharge conveyor as the labels are concurrently removed from the bottles.

In the preferred embodiment, the bottle transporter is a turret with a plurality of circumferentially spaced label removal stations. The Labeler Patent, which is hereby incorporated by reference in its entirety, discloses one system suitable for use with the delabeler of this invention for supplying bottles to a turret in appropriately spaced relationship and then removing bottles from the turret after a work operation has been performed.

With the preferred turret of this invention, each delabeling station includes a bottle support platform which, in contrast to the machine of the Labeler Patent, is vertically fixed. Each delabeling station also has a bottle hold-down which is moved into engagement with a bottle once it has been transferred from the supply conveyor and restrains the bottle on the platform of that station until the bottle reaches a discharge station for discharge onto the exit conveyor.

Each delabeling station also includes a cutter. Preferably, the cutter is a differential cutter which cuts the relatively soft plastic of a plastic label top to bottom while not cutting or otherwise marring the bottle being delabeled.

Where the label is polyethylene or similar material, the inherent elasticity of the label contracts the label once cut, thus widening the cut and concurrently tending to sever any physical adherence of the label to the bottle. As the turret continues to rotate the bottle with its cut label pass through a label-removing mechanism.

With one embodiment, the label-removing mechanism has a flushing station where flowing water flushes the cut label from the bottle and onto a label-separating conveyor positioned below the turret.

The separating conveyor allows the flush water to pass through to a collection tank positioned below it. Water from the collection tank is pumped back to the flusher for re-use. Separated labels are transported by the separating conveyor to a collection bin.

With another embodiment, an air blast separates labels from the bottles. The separated labels are then forced by pressure differential into a partially evacuated circuit.

The preferred differential cutter is a water jet which is traversed vertically from top to bottom of the label, or vice versa, to affect label-cutting action. With careful control of the rate of cutter traverse together with the pressure, volume and velocity of the water emitted by each such jet, the desired differential cutting action is achieved. The labels are effectively and thoroughly cut top to bottom, but the bottle is neither cut nor marred.

The novel differential cutters provide one of the outstanding features of the present invention. In one embodiment, a vertically disposed piston and cylinder provide a high-pressure water pump. An air cylinder is coupled to the piston selectively to drive the piston upwardly when a label cut is to be effected. The upward orientation is preferred because any air entrained in supplied water will rise to the top and be expelled prior to or with the water during each cutting cycle. Accordingly, air build-up in the water cylinder is avoided. The output from the water cylinder is directed through high pressure tubing to a nozzle with a horizontally directed output.

The preferred embodiment of the cutter is in the form of a novel subcombination of a system embodying this invention. With the preferred cutter, each work station has a cylindrical water tube mounted in a fixed position adjacent the station. The tube is connected to a water supply at its base, and when the tube is filled with water, it functions as a jet-producing piston. A tubular piston rod surrounds the water tube. The rod has an internal fluid chamber, the walls of which slidingly engage the water tube. A fluid cylinder surrounds the piston rod in concentric relationship and an annular piston interposed between the cylinder and the rod effects selective reciprocal motion of the rod. The jet-producing cutter nozzle is fixed to the piston rod near its upper end and is in fluid communication with the piston rod's fluid chamber.

When the preferred cutter is in use, the annular piston is driven upwardly to extend the piston rod and elevate the nozzle. Concurrently, water is introduced into the water tube to fill both the tube and the fluid chamber of the piston rod. The direction of piston and rod is then reversed, and concurrently, the water supply is cut off. As the piston descends, the water tube functions as a jet-producing piston as water is driven from the piston rod's fluid chamber through the nozzle to effect a label-cutting action.

With either cutter embodiment, water is supplied from a suitable source such as a factory water line. Water flows from the water line through a check valve into the water cylinder's chamber in the one embodiment and the water tube in the preferred embodiment. With the first embodiment, water is supplied as or after the piston is retracted following a label-cutting cycle. With the preferred embodiment, water is supplied as the nozzle is elevated. With both embodiments, high-pressure water lines are avoided apart from the tubing connecting the water cylinder to the nozzle in the one case and the piston rod in the other.

Similarly, the air cylinder does not require pressure other than that normally supplied by a source such as factory air. By adjustment of the air pressure supplied to the cylinder, one is able to control the pressure, volume and velocity of water emitted by the nozzle and thereby effect the desired differential cutting of labels without harm to the bottles.

Accordingly, the objects of the invention are to provide a novel and improved high-speed automatic delabeling machine and a method of removing labels from vessels.

DESCRIPTION OF THE PREFERRED EMBODIMENT

Figure 1:
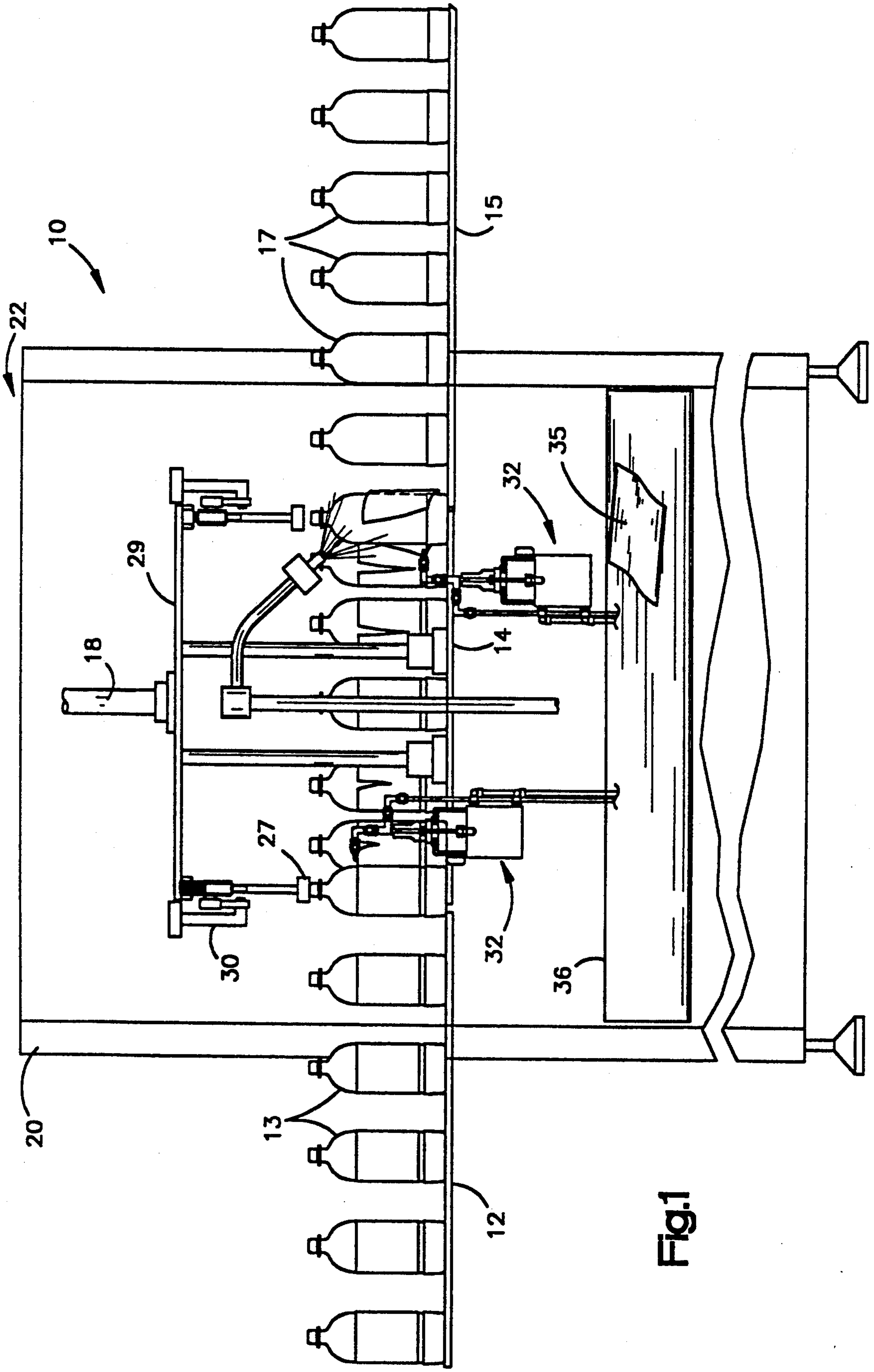
FIG. 1 is a front elevational view in somewhat schematic form showing the bottle delabeling system of this invention.
Figure 2:
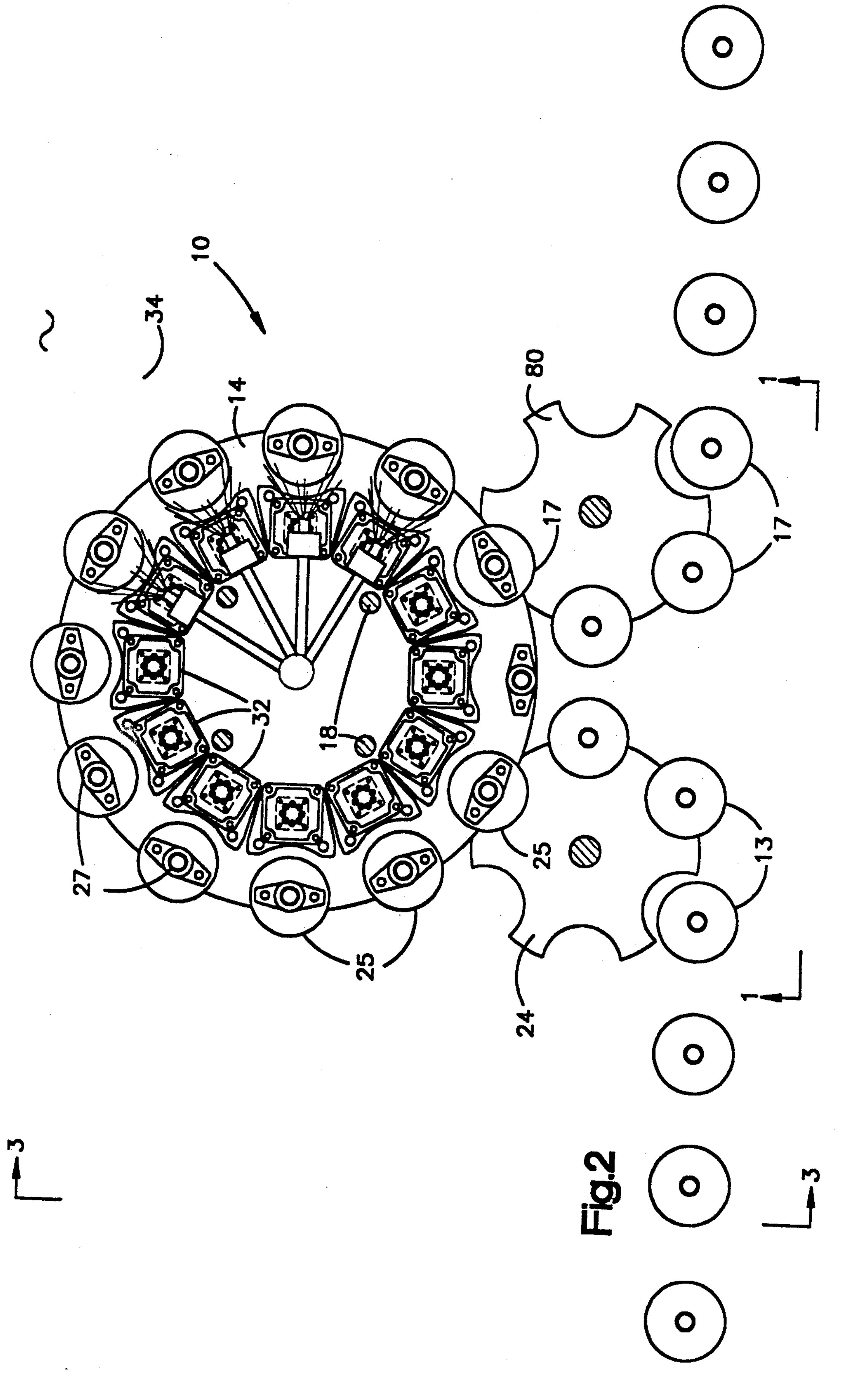
FIG. 2 is a top plan view of the turret of this invention, from the plane indicated by the line 2—2 in FIG. 3, showing star wheels for transfer of bottles to and from the turret.
Figure 3:
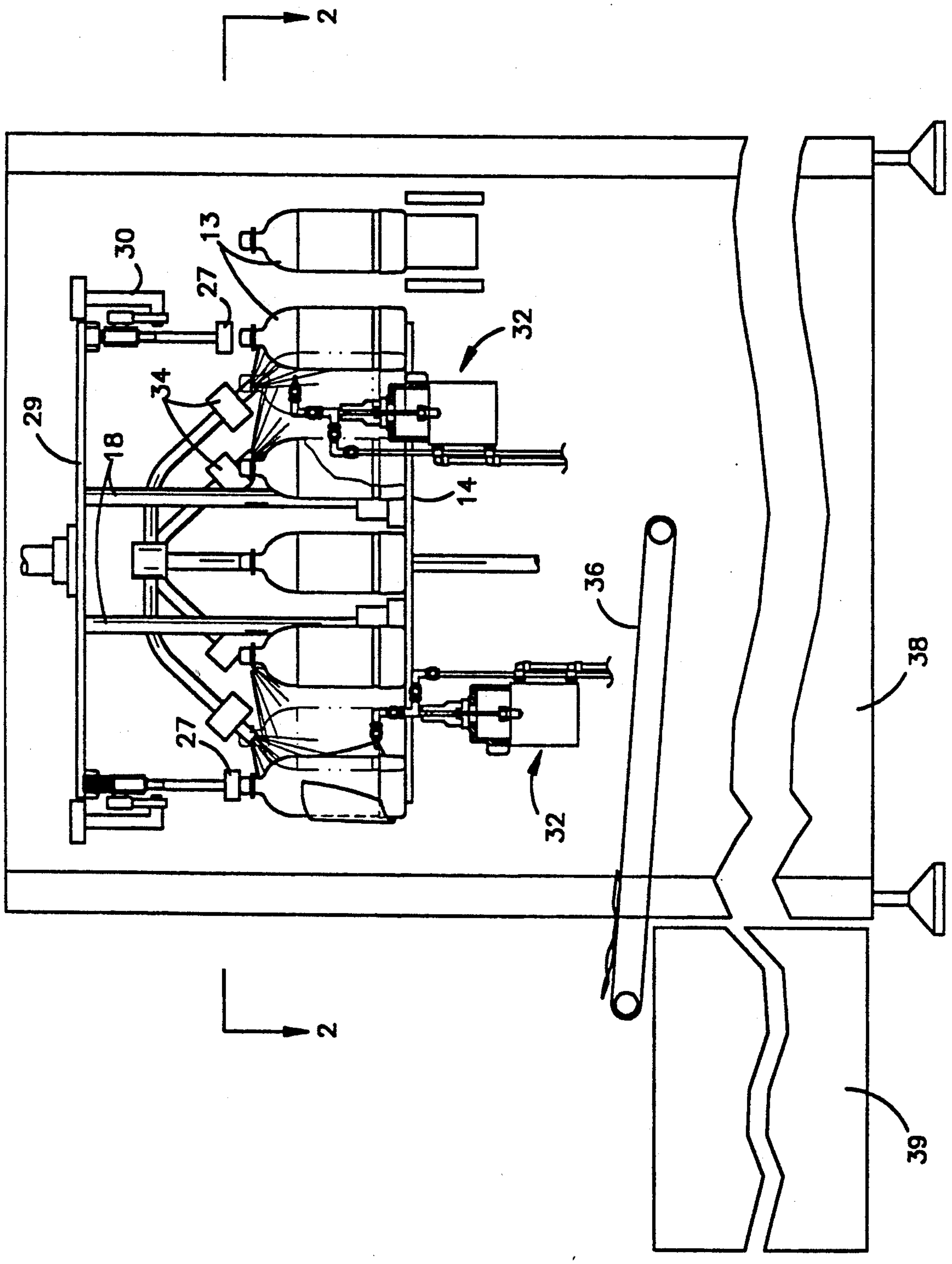
FIG. 3 is an end elevational view of the machine in FIG. 1.

Referring to the drawings and FIGS. 1–3 in particular, a delabeling machine of this invention is shown generally at 10. As is best seen in FIG. 1, a supply conveyor 12 delivers labeled bottles 13 to a bottle transporter in the form of a turret 14. A discharge conveyor 15 receives delabeled bottles 17 from the turret and transports them downstream for further processing.

The turret 14 is supported by an overhead shaft 18. The shaft 18 is connected by structure (not shown) to a frame 20 of a delabeling section shown generally at 22. The structure supporting the shaft 18 on the frame 20 includes a drive for rotating the shaft and with it the supported turret 14.

While the supply and exit conveyors 12, 15 are shown schematically here, it should be recognized that the supply and exit mechanism of the Labeler Patent which has been incorporated by reference is well suited for delivering labeled bottles to and transferring unlabeled bottles from the turret 14 of the machine 10.

A supply star wheel 24 is provided. The supply star wheel 24 transfers labeled bottles 13 from the supplier conveyor 12 to a registered one of twelve work stations 25 on the turret 14.

Each of the work stations 25 includes a bottle hold-down 27. The bottle hold-downs 27 are mounted on a rotatable hold-down support 29 which is secured to and rotates with the shaft 18. Each of the hold-downs 27 includes a cylinder 30 or equivalent structure to shift its hold-down 27 between a bottle-retaining position at the left of FIG. 1 and a bottle release position at the right in FIG. 1.

Each of the delabeling stations includes a differential cutter assembly. One embodiment of the cutter assembly is shown at 32' in FIGS. 1 and 3–5, while the currently preferred form is shown at 32' in FIG. 6. With the embodiment of FIG. 1, the cutter assemblies are mounted for vertical reciprocal movement between the positions shown in FIGS. 4 and 5, and also shown to the left and right respectively in FIGS. 1 and 3. The cutter assemblies 32 or 32', each being part of a delabeling station 25, are mounted on the turret 14 for rotation with it.

With the embodiment of FIGS. 1–5, flushers 34 shown schematically at the top of FIG. 2 are provided to water flush cut labels from the bottles. The flush water and cut labels 35 (FIG. 1) drop onto a screen conveyor shown schematically at 36 in FIG. 3. Flush water passes through the screen conveyor 36 into a collection vat 38. Separated labels are transported by the screen conveyor 36 to a label collection bin 39.

Figure 7:
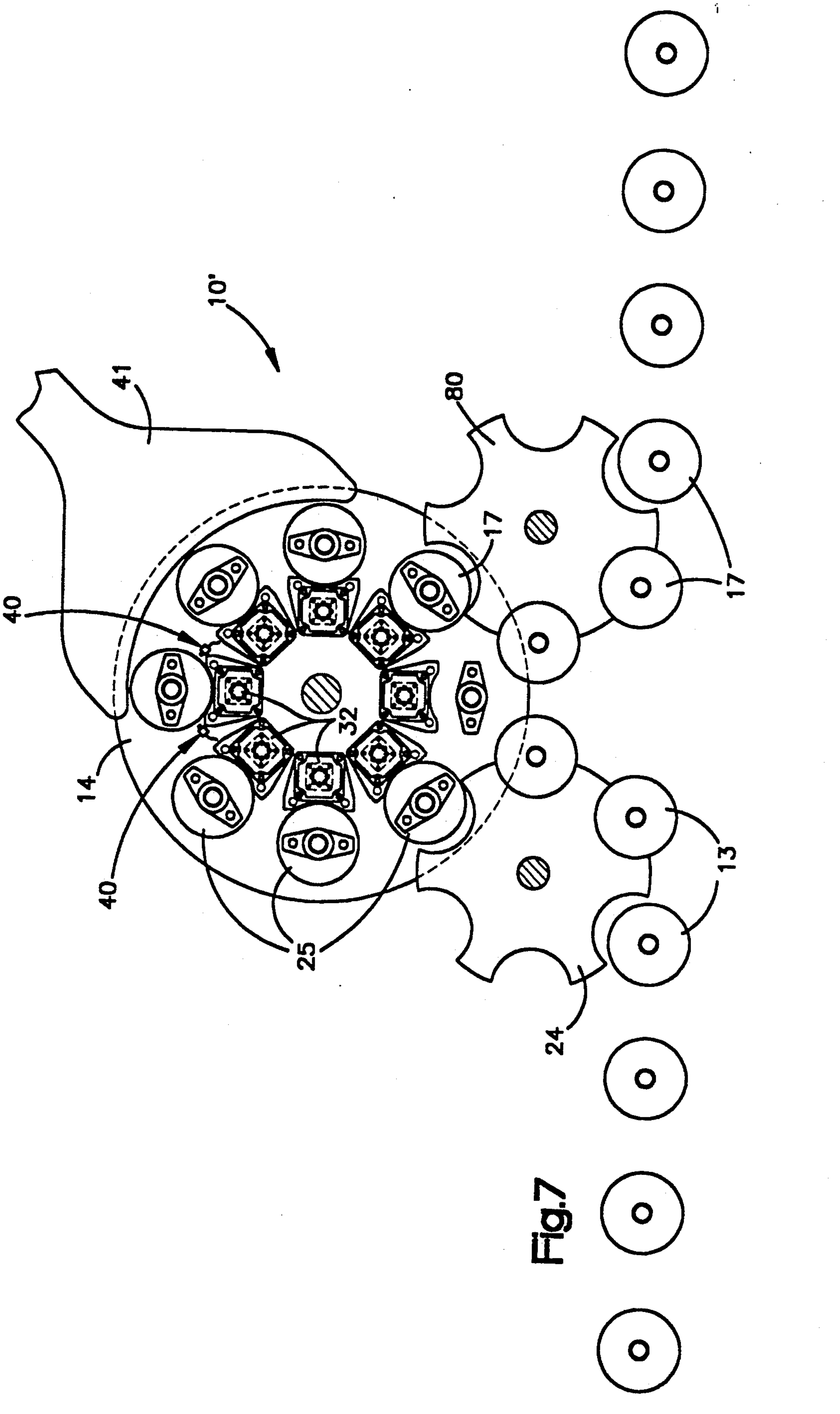

Referring to FIG. 7, an alternate label-removing mechanism is shown. In FIG. 7, the delabeling machine 10' includes air blast mechanisms 40 positioned to blow cut labels loose from their bottles. Once loosened, the labels are forced, by differential air pressure, into a vacuum conduit or evacuated hood 41. The hood 41 is connected to a vacuum source and to a label collection device, neither of which is shown.

Figure 4:
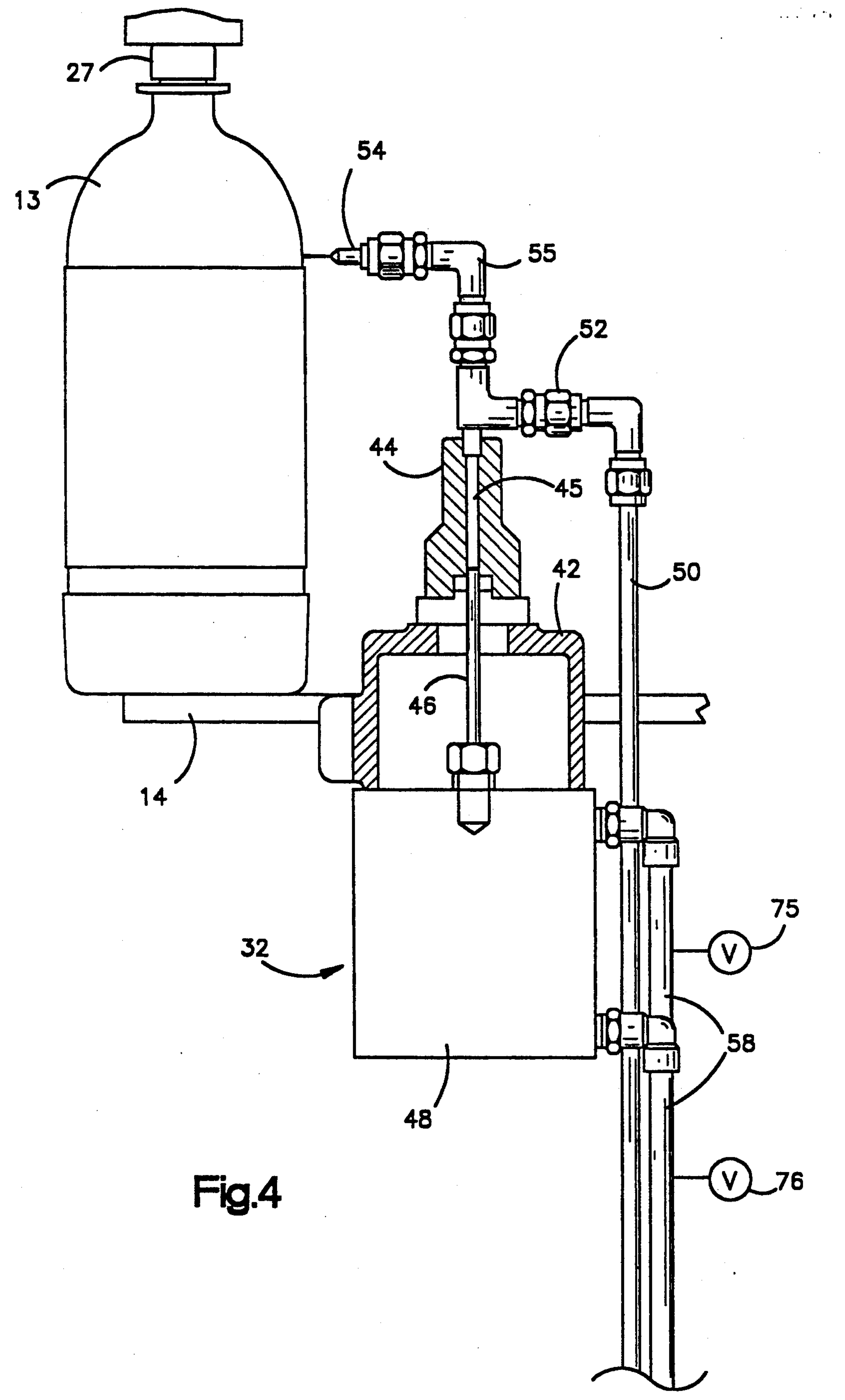
FIG. 4 is an enlarged fragmentary view showing a labeled bottle with the differential knife positioned to commence a cutting operation.
Figure 5:
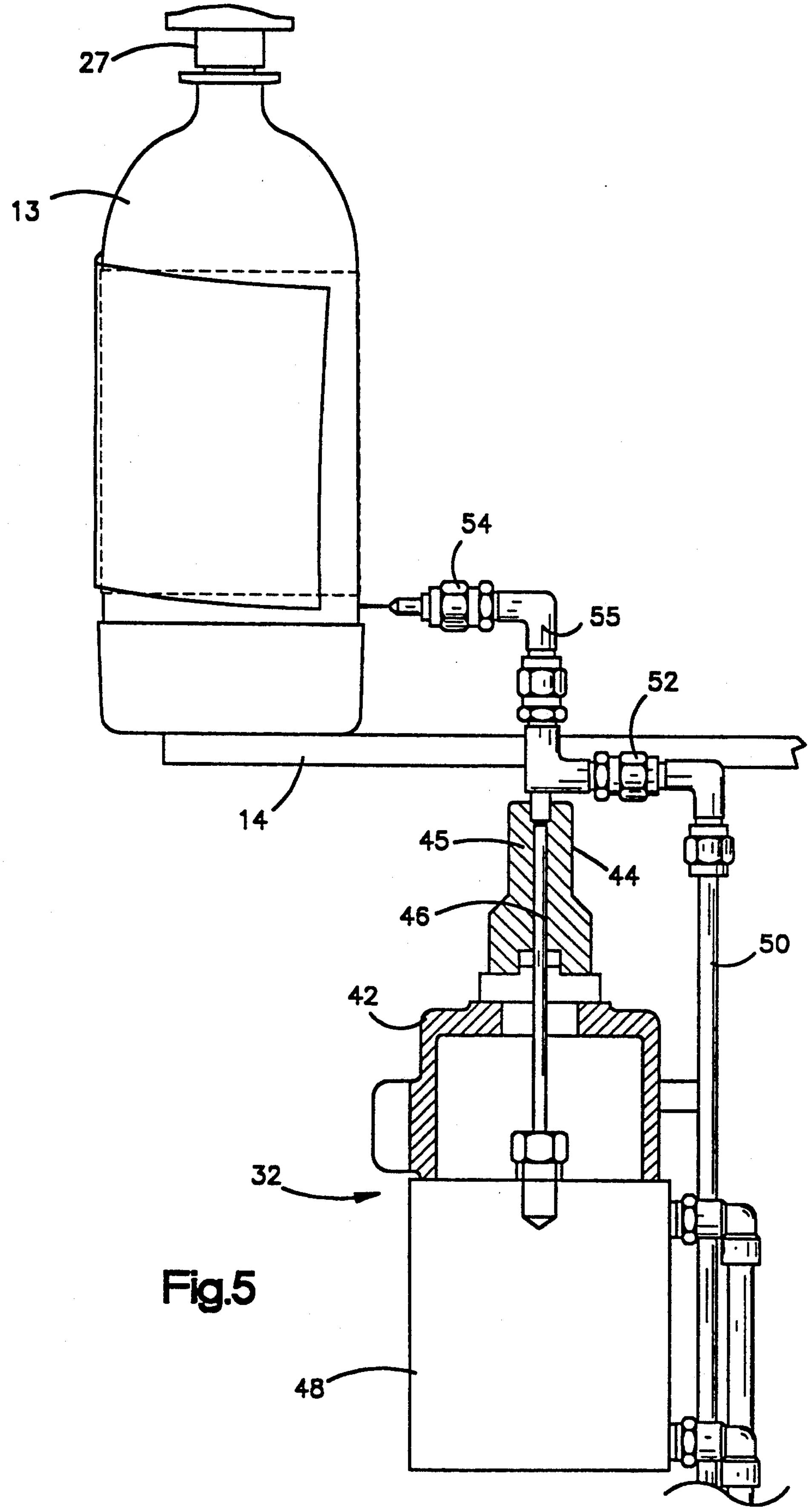
FIG. 5 is a view corresponding to FIG. 4 showing the label and the differential knife after the cutting operation has been concluded.

Referring to FIGS. 4 and 5, the differential cutter assemblies 32 are shown with some detail. Each cutter assembly includes a housing and frame 42 for supporting the balance of the cutter assembly. Mechanism (not shown) is interposed posed between the turret and the housing and frame to cause selected vertical reciprocation of the cutter assemblies. A housing 44 for a reciprocal water pump is mounted on the top of the housing and frame 42. The pump housing 44 defines an internal, cylindrical, water chamber 45. A piston rod 46 is provided for reciprocation between a lower position shown in FIG. 4 and an upper position shown in FIG. 5. This reciprocation is effected by an air cylinder 48 that is operably connected to the piston 46.

A water supply conduit 50 is coupled through a check valve 52 to the water chamber 45. At the conclusion of the cutting cycle, water is supplied through the check valve 52 to fill the water chamber 45. A cutting nozzle 54 is connected through high-pressure tubing 55 to the water pump housing 44 for communication with the water pump chamber 45.

Figure 6:
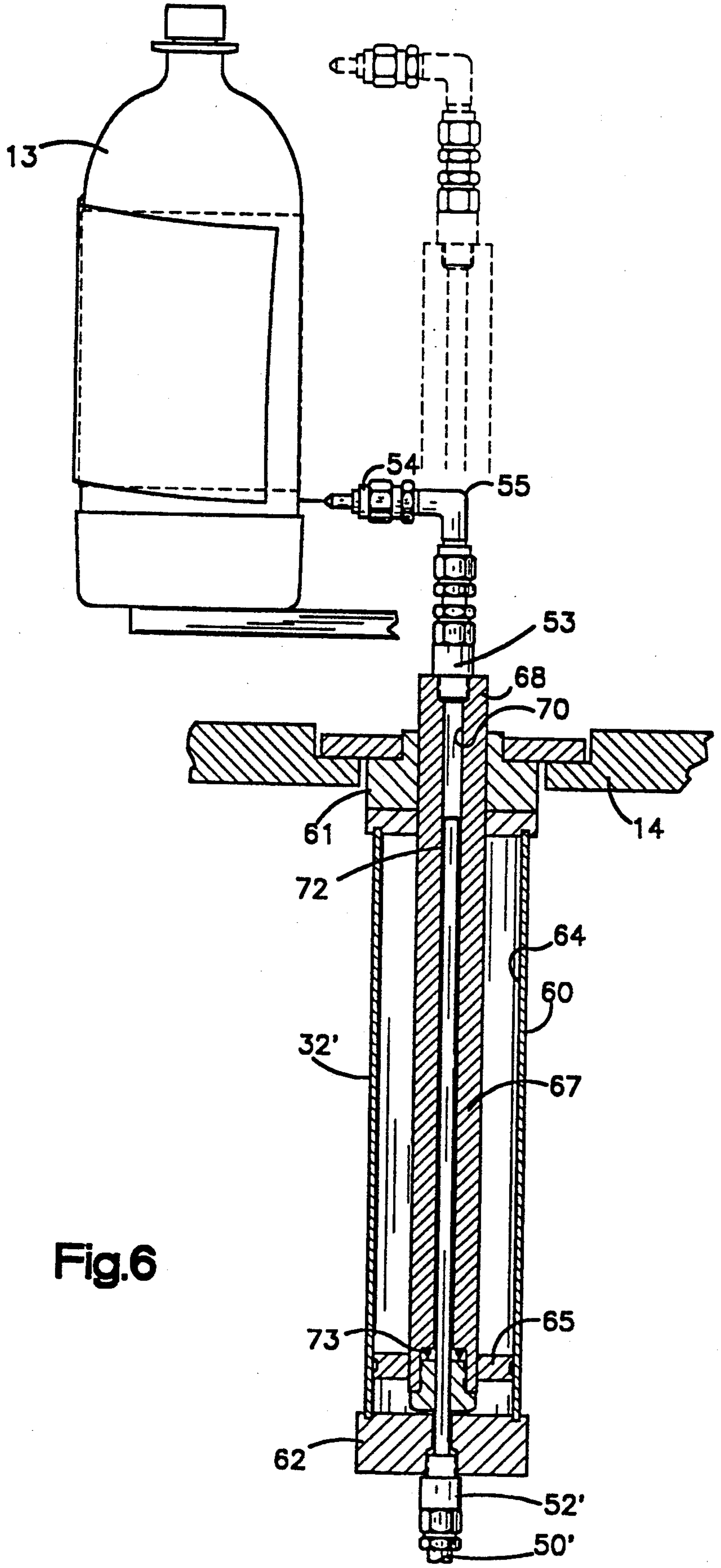
FIG. 6 is a partially sectioned elevational view of the preferred cutter assembly; and, FIG. 7 is a diagrammatic plan view of an air blast and vacuum system for removing cut labels.

An alternate and now preferred cutter assembly 32' is shown in FIG. 6. The cutter 32' includes a tubular cylinder 60 which is interposed between upper and lower annular end closures 61, 62. The upper end closure 61 is fixed to the turret 14 so that the cylinder 60 depends from it. The cylinder has smooth, cylindrical internal walls 64 which define an internal fluid chamber. An annular piston 65 is reciprocally mounted in the cylinder 60 in sliding and sealing engagement with the walls 64. An annular piston rod 67 is carried by the piston 65 for reciprocation with it. The rod projects vertically upwardly through, and in slidable and sealing relationship with, the upper end closure 61. Thus, the piston rod 67 has an upper, external portion 68 extending above and projecting from the upper closure 61. The piston rod 67 includes a throughbore 70 which defines and functions as a water chamber.

A nozzle 54 is connected by tubing 55' to the upper portion 68 of the piston rod. The tubing provides fluid communication between the piston rod bore 70 and the nozzle 54.

A tubular jet piston 72 is positioned co-axially within the piston rod bore 70. The external walls of the jet piston 72 are in complemental sliding relationship with the walls defining the rod bore 70. A packing 73 surrounds the jet piston 72 and effects a fluid-tight seal between the rod bore 70 and the jet piston 72. A water supply line 50' is connected through a check valve 52' to the lower end closure. Water from the supply line 50' is fed into the jet piston 72 concurrently with the elevation of the piston and rod. Water flows through the jet piston 72 as the piston and rod are rising to maintain the piston rod bore 70 in a filled condition.

On reversal of the piston to cause it to descend, the check valve 52' prevents water from escaping from the tubular piston 72. Since the tubular piston is filled with water, it acts the same as if it were a solid rod piston forcing water through the nozzle 54 as it descends from its pre-cut position shown in phantom in FIG. 6 to the label cut position shown in solid lines.

OPERATION

In operation, labeled bottles 13 are transferred by the star wheel 24 from the supplier conveyor 12 to the turret 14. As viewed in FIG. 2, the transfer from the star wheel to the turret occurs when an empty station 25 is at the seven o' clock position. The turret rotates in a clockwise direction as viewed in FIG. 2. When a labeled bottle arrives at the eight o'clock position, the differential cutter assembly 32 is in the position of FIG. 4. Air is delivered to the cylinder 48 via air supply conduits 58. Operation of the air cylinder drives the water piston 46 upwardly causing check valve 52 to close and water to be expelled from the cutting nozzle 54. Because of the upward operation of the water piston 46, any air entrapped in the water chamber 45 will be expelled prior to and perhaps with the water. The check valve 52 assures that the water is expelled through the nozzle and not returned to the supply line 50.

Concurrently, with the upward movement of the water piston 46, the entire differential cutting assembly 32 is traversed downwardly from the position shown in FIG. 4 to the position shown in FIG. 5 to cut the label from top to bottom. This cutting action occurs as a cutter assembly is transferred from the eight o' clock to the ten o'clock position as viewed in FIG. 2. Assuming the label to be polyethylene, once it is cut, its inherent resiliency will cause retraction tending to pull the label from the position shown in dotted lines in FIG. 5 to the position shown in solid lines.

With the now preferred cutter arrangement, air under pressure is introduced below the piston 65 to elevate the piston rod and the nozzle 54 to the position shown in phantom in FIG. 6. Concurrently, water is drawn through the check valve 52' to maintain the jet piston 72 and the piston rod bore 70, in a filled condition. Once the nozzle has reached its upward position, air is exhausted from under the piston 65 and air under pressure is introduced above it. This drives the piston and its connected rod 67 downwardly. As the piston rod descends, water is forced through the nozzle 54 to effect a differential cut. The check valve 52' prevents the escape of water from the jet piston 72 so that the tubular jet piston 72 and the column of water maintained within it function as a solid piston rod to drive water from the piston rod bore 70 through the tubing 55' and thence the nozzle 54.

With either the cutter assembly of FIGS. 4 or 6, the pressure of the cutting water jet is a function of the pressure supplied to the air cylinder which causes water to be expelled through the nozzle 54. To this end, valves shown schematically at 75, 76 (FIG. 4) are provided to adjust the air pressure supplied to the cylinder 48. In the case of the embodiment of FIG. 4, an independent adjustment, not shown, is provided to adjust the mechanism causing cutter reciprocation. In the case of the embodiment of FIG. 6, the speed of cutter traverse and the pressure of the nozzles are interconnected variables with a single adjustment. Thus, with the embodiment of FIG. 6, one cannot adjust the speed of cutter traverse without also adjusting the pressure of the cutting jet while in the embodiment of FIG. 4 and independent adjustments for these two variables are provided.

The flusher 34 of the embodiment of FIGS. 1-5 is shown at the two o'clock station in FIG. 2. Further flushers could be supplied at the twelve, one, three and four o'clock stations if desired. The cut labels are flushed from the bottles and the turret onto the screening conveyor 36. Flush water passes through the screening conveyor 36 into the collection vat 38 while removed labels 35 are transported by the screen conveyor 36 to the label receptacle bin 39. When the delabeled bottle 17 reaches a transfer position shown at five o'clock in FIG. 2, an exit star wheel 80 transfers the delabeled bottles 17 onto the discharge conveyor 15 for transport to another location for further processing.

With the embodiment of FIG. 7, blasts of air are emitted from the mechanisms 40 to blow cut labels loose from their respective bottles. Through pressure differential, the loosened labels are then drawn into the vacuum hood 41 and thence, transported off to a collection station.

Although the invention has been described in its preferred form with a certain degree of particularity, it is understood that the present disclosure has been made only by way of example and that numerous changes in the details of construction and the combination and arrangement of parts may be resorted to without departing from the spirit and the scope of the invention as claimed.

We claim:

1. A method of removing a label from an object comprising:
   a) directing a high pressure fluid jet against an outer surface of the label;
   b) relatively moving the jet and the object to cut the label from one end to another end; and,
   c) maintaining the pressure, volume and velocity of the jet fluid at respective values which are high enough to effect cutting of the label while low enough to avoid cutting the object.

2. The method of claim 1 wherein the label is a relatively soft plastic sleeve and the object is a bottle of relatively harder plastic.

3. The method of claim 1 wherein the fluid is water.

4. The method of claim 1 wherein a fluid driven piston is driven to force fluid through a nozzle to produce the jet.

5. The method of claim 4 wherein the pressure, volume and velocity of the jet fluid is adjusted by adjusting the pressure of fluid supplied to drive the piston.

6. The method of claim 1 further including the step of stripping the cut label from the bottle.

7. A process of removing tubular labels from bottles comprising:
   a) sequentially feeding the bottles to a bottle transporter having a plurality of spaced label removal stations;
   b) sequentially positioning the bottles one at a time at the stations;
   c) moving each positioned bottle through a portion of a path to a discharge station;
   d) forming a cut in each of the labels extending from top to bottom by impinging fluid jets against outer surfaces of the labels as their respective bottles are moving along the portion; and,
   e) removing the cut labels from the bottles.

8. The process of claim 7 wherein the transporter is a turret.

9. The process of claim 7 wherein the labels are removed by flushing.

10. The process of claim 9 wherein the flushed labels are screen separated from the fluid and the fluid is collected in a tank below the screen.

11. The process of claim 7 wherein the bottles and their respective jets are relatively moved axially of the bottle to effect each label cut.

12. The process of claim 11 wherein the bottles are maintained axially stationary while their respective jets are moved axially to effect a label cut.

13. The process of claim 7 further including the step of maintaining the pressure, volume and velocity of the jet fluid at respective values which are high enough to effect cutting of the labels while low enough to avoid cutting or otherwise marring the bottles.

14. The process of claim 7 wherein the labels are relatively soft plastic sleeves and the bottles are of relatively harder plastic.

15. The process of claim 7 wherein the fluid is water.

16. The process of claim 7 wherein fluid driven pistons are driven to force fluid through associated ones of the nozzles to produce the jets.

17. The process of claim 16 wherein the pressure, volume and velocity of each jet is adjusted by adjusting fluid pressure supplied to its associated piston.

18. The process of claim 7 wherein the label removing stations are circumferentially spaced and wherein the path portion is a segment of an orbit.

19. A process of removing a plastic tubular label from bottles comprising:
   a) sequentially positioning the bottles at a labeling station;
   b) traversing a differential cutter relative to each positioned bottle from one end of a label on a positioned bottle to another end;
   c) maintaining the cutter at its differential cutting level as the cutter is traversed such that each label is cut from the one end to the another end while its bottle remains uncut;
   d) separating the cut label from the bottle; and,
   e) collecting the separated labels.

20. The process of claim 19 wherein the cutting of each label allows the inherent resiliency of a cut label to assist in the separating step.

21. The process of claim 19 wherein the cutter is a fluid jet.

22. The process of claim 21 wherein the jet fluid is water.

23. The process of claim 22 further including the step of adjusting the volume, pressure and velocity of the jet to achieve such differential cutting.

24. The process of claim 19 wherein the separating step is accomplished with a water flush.

25. The process of claim 19 wherein the separating step is accomplished with an air blast mechanism and a vacuum pick up.

26. The method of claim 1 further including the step of separating the cut label with an air blast mechanism and a vacuum pick-up.

27. A method of removing a tubular label from an object comprising:
   a) directing a high pressure fluid jet against the label;
   b) relatively moving the jet and the object to cut the label from one end to another end;
   c) maintaining the pressure, volume and velocity of the jet fluid at respective values which are high enough to effect cutting of the label; and,
   d) stripping the cut label from the object.

28. The method of claim 27 wherein the label is a relatively soft plastic sleeve and the object is a bottle of relatively harder plastic.

29. The method of claim 27 wherein the fluid is water.

30. The method of claim 27 wherein an air cylinder driven piston is actuated to force fluid through a nozzle to produce the jet.

31. The method of claim 30 wherein the pressure, volume and velocity of the jet fluid is adjusted by adjusting air pressure supplied to the cylinder.

32. The method of claim 27 wherein the stripping step is accomplished with a water flush.

33. The method of claim 27 wherein the stripping step is accomplished with an air blast mechanism and a vacuum pick-up.

* * * * *